Sept. 23, 1952     H. G. WEISS     2,611,293
MOTION-PICTURE PROJECTOR ATTACHMENT
Filed Aug. 2, 1949
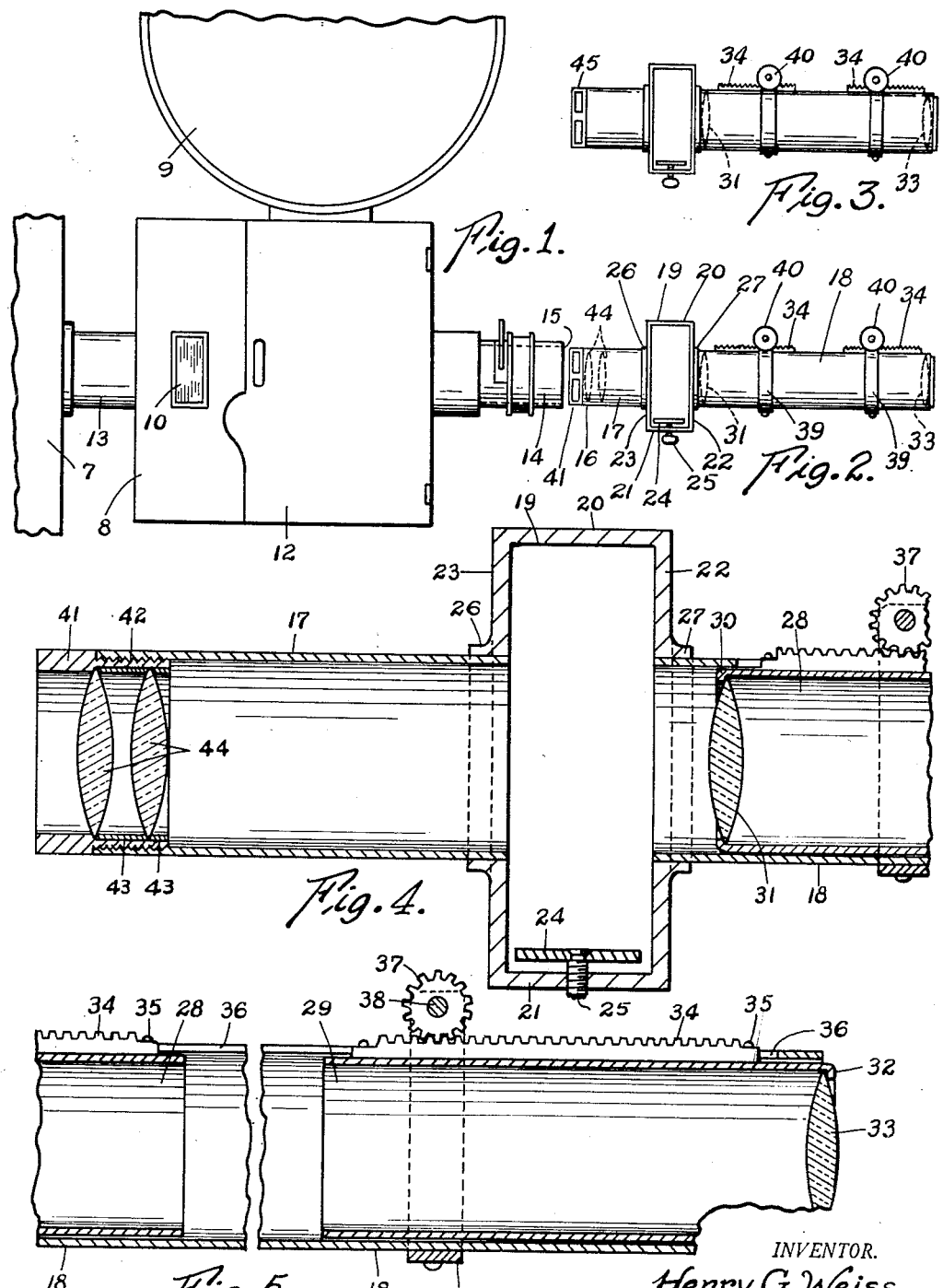
INVENTOR.
Henry G. Weiss
BY Joseph F. Zugelter
Atty.

Patented Sept. 23, 1952

2,611,293

UNITED STATES PATENT OFFICE 2,611,293

MOTION-PICTURE PROJECTOR ATTACHMENT

Henry G. Weiss, Cincinnati, Ohio

Application August 2, 1949, Serial No. 108,102

4 Claims. (Cl. 88—24)

This invention relates to an attachment for motion picture projectors, whereby still pictures or subjects in other than strip form can be projected onto a distant screen with the use of the same powerful light source employed in projecting the motion picture film. The attachment can be used also to project spinners or other game devices on to the screen, for use in conducting contests or games such as are currently popular. As the disclosure proceeds, the range of uses for the attachment will become readily evident to those conversant with the art and practice of picture exhibition.

An object of the invention is to provide a stereopticon attachment for regulation motion picture projectors, which utilizes the powerful light source of the projector, and which may be attached and detached relative to the projector in an instant, without any changes or adjustments of the projector.

Another object is to provide an attachment of the character stated, which is simple and inexpensive of construction, and capable of use either in conjunction with the projector lens assembly, or without the lens assembly, as may be desired.

Another object of the invention is to provide a novel optical system involving a new arrangement of lenses, subject holder, and light source, resulting in clearer and brighter pictures or projected subjects than have been possible with the use of equipment heretofore available.

The foregoing and other objects are attained by the means described herein and illustrated upon the accompanying drawing, in which:

Fig. 1 is a fragmentary side elevational view of a standard full-size motion picture projector, such as is used for public exhibition of pictures upon large screens.

Fig. 2 is a side elevational view of the stereopticon attachment of the present invention, shown in readiness for application to the lens assembly housing of the projector.

Fig. 3 is a view similar to Fig. 2, showing a slightly modified form of the device of the invention.

Fig. 4 is an enlarged cross-sectional view taken vertically along the major axis of the Fig. 2 illustration, showing the left end thereof.

Fig. 5 is a view similar to Fig. 4, showing the right end of the device.

Referring to the drawing, 7 indicates a source of brilliant light here shown as a lamp-house, in which is located an electric arc or the equivalent, not shown. Light from the source passes through tube 13 and enters the housing 8 in which are located the usual film frame and intermittent mechanism through which the film is threaded and fed from the usual reel enclosed within the case 9. The intermittent mechanism is observable through a window 10, and access thereto may be had by way of a hinged door 12 normally closing the housing. This housing is commonly referred to as the head of the machine. Film leaving the head winds onto a receiving reel located beneath the head, but not shown here as same is of no importance to the present invention.

At the forward end of head 12 is located the usual barrel or housing 14 accommodating the usual lens assembly needed in projecting motion pictures onto a distant screen. The lens assembly of such a machine is generally in the form of a tube freely insertable into the forward open end 15 of the barrel or housing 14, the tube carrying usually a pair of condensing lenses. Removal of the lens assembly from the cylindrical housing 14 is effected by simply sliding it forwardly from the open end 15.

All of the foregoing is common practice in the art, and should therefore require no further explanation in detail. The attachment forming the subject matter of the present invention is in the form of a generally tubular structure as illustrated by Figs. 2 and 3, having an end portion 16 to be snugly fitted into the open end 15 of the lens assembly housing, where it is frictionally held in axial alignment with said housing. The attachment may be so applied regardless of the presence or absence of the lens assembly, as the latter rests well within the housing 14 at some distance from the open end 15. In Fig. 1, the lens assembly has been removed preparatory to fitting the attachment of Fig. 2 to the housing 14.

Referring to Fig. 2 the stereopticon attachment will be seen to comprise a rear outer tube 17 and a forward outer tube 18, spaced apart in axial alignment by a holder or box 19. This part 19 has but four walls, namely a top wall 20, bottom wall 21, a front wall 22, and a rear wall 23. The sides of the box are open, so as to accommodate a picture slide or frame, or any other transparency to be projected by light passing through the tubes 13, 14, 17 and 18, from the light source 7. Any suitable adjustment means, such as platform 24 and screw 25, may be provided for establishing the proper elevation of a slide or transparency placed within the holder or box. The holder or box may be securely connected to the tubes 17 and 18 in any suitable manner, as by means of welding, screw-threading, or the like. As shown in the drawing by way of example, the front and rear walls 22 and 23 are furnished with annular flanges 26 and 27, in which the tubes are held with a drive fit and a weld. As will be understood, the flanges 26 and 27 define the openings in the front and rear walls, which allow a light beam to pass through the tubes 17 and 18.

As is best illustrated by Fig. 5, a pair of interior tubes or cylinders 28 and 29 are slidably supported for lengthwise adjustment within the outer tube 18. The cylinder 28 has an end 30 adapted to hold securely a double-convex lens 31, or like element, capable upon bodily movement within the outer tube 18, of altering the size of a picture or image projected onto the viewing screen. This element 31 is known as the picture size adjuster. The second cylinder 29, which is likewise bodily shiftable axially within the tube 18, has an end 32 suitably adapted to securely hold a focusing lens 33, here disclosed as a double-convex lens. By adjusting the cylinder 29 lengthwise, an image projected upon a distant screen may be sharpened or clarified whenever necessary. It is considered within the skill of the optical expert to establish the proper focal length of the lenses, as this will depend upon variable factors peculiar to individual installations.

Any suitable means of bodily shifting the cylinders 28 and 29 within the tube 18 may be employed. By way of example, this may be achieved by means of a rack and pinion arrangement, as shown. Each cylinder may carry a toothed rack 34 riveted, screwed, or otherwise secured to the outer surface of the cylinder at 35. A longitudinal slot or way 36 in the outer tube permits the rack teeth to extend through, and to engage the teeth of a pinion 37. Pinion 37 is fixed to a rotatable shaft 38 journaled in the upper portion of a band or ring 39 which surrounds and is secured to the outer tube. A handle or knob 40 fixed to the shaft provides the means of manually rotating the pinion and shifting the rack and the cylinder thereto attached. The manipulating means for the inner cylinders preferably are identical in construction, as shown; and as previously stated, the manipulating means is capable of considerable modification and substitution of equivalents, within the scope of the invention.

Referring to Figs. 2 and 4, the left or free end of tube 17 may carry a ring or bushing member 41 shaped and dimensioned to effect a snug fit within the lens assembly housing 14 as previously explained. This bushing preferably has tight connection with the end of the tube, and may be made removable by means of the threaded connection 42. Any suitable form of mounts 43 may be incorporated in the bushing for the purpose of mounting therein a light condensing means, which may be in the form of a pair of double-convex lenses 44—44, or the equivalent. This construction, shown in Figs. 2 and 4, is suitable for application to the projector when the lens assembly of the projector is removed from the housing 14. In the event that the lens assembly of the projector is permitted to remain within the housing 14, the stereopticon attachment may be used in the Fig. 3 form, wherein the condensing means is omitted. Thus, the only difference between the devices of Figs. 2 and 3, is that the Fig. 3 device is provided with an end ring or bushing 45 having no condensing lenses therein. Bushing 45, like the bushing 41, makes a snug fit within the open end 15 of the lens assembly housing 14 when the stereopticon is to be used. The bushing 45, of course, may be eliminated if the tube end 16 of the stereopticon attachment is properly shaped and dimensioned to fit snugly and accurately within the free end of housing 14, to support the attachment in axial alignment with said housing. Any additional support for the attachment may be furnished, if necessary.

It is to be noted that the motion picture projection machine, in accordance with the present invention, may be converted into a stereopticon almost instantly, without any change whatever being made in the motion picture machine or its adjustments. With equal facility and dispatch, reconversion may be effected for the exhibition of motion pictures. The speed with which the conversion may be achieved is very important in the public exhibition of pictures and the like, as the showings are generally timed or scheduled.

Another point worthy of special note, is the fact that the device of the invention makes possible the use of a common light source for both types of exhibitions mentioned, with a resultant decided improvement in the brilliancy of the stereopticon exhibition. Contrary to the usual practice, the condensing means 44—44 is located intermediate the light source and the transparency placed in the holder 19. In other words, the condensing lenses are ahead of the image-bearing plate or transparency, rather than behind it. This arrangement has proven greatly superior to the usual practice of passing the projection light first through the plate or transparency, and then through the condensing lens.

By utilizing the regular motion picture projector arc or light source for stereopticon purposes, a clear and brilliant image is assured; and when this is accomplished in the manner herein disclosed, without waste of time, and without disturbing adjustments on the motion picture projector, the alternative use of the motion picture projecting machine for public exhibition purposes is rendered feasible for the first time.

It is to be understood that various modifications and changes in structural details of the device may be made, within the scope of the appended claims, without departing from the spirit of the invention.

What is claimed is:

1. An attachment for quickly converting to stereopticon usage, a motion picture projector characterized by an electric-arc light source and a tubular lens assembly housing, said attachment comprising a main tube in sections, one a forward section and the other a rear section, said rear section having one end dimensioned to frictionally engage the lens assembly housing so as to support the attachment in axial alignment therewith, a transparency holder on the opposite end of said rear section, said holder having a transverse passageway to receive a transparency to be light-projected, a longitudinally shiftable cylindrical member including a lens, disposed in the forward section of the main tube for adjusting the size of the image of a transparency placed in the holder and illuminated by the projector light source, a second longitudinally shiftable cylindrical member carried by said main tube and movable axially relative to the first-mentioned cylindrical member, and including a lens for focusing said image, light condensing means in the rear section of the main tube, and means joining one end of the forward section to the transparency holder in axial alignment with the rear section of the main tube.

2. An attachment for quickly converting to stereopticon usage, a motion picture projector characterized by an electric-arc light source and a tubular lens assembly housing, said attachment comprising a main tube in sections, one a longitudinally slotted forward section and the other a rear section, said rear section having one end dimensioned to interfit with the lens assembly housing so as to support the attachment in axial alignment therewith, a transparency holder on the opposite end of said rear section, said holder having a transverse passageway to receive a transparency to be light-projected, a pair of longitudinally shiftable cylinders within the forward section of the main tube, an image size adjusting lens carried by one of said cylinders, a focusing lens carried by the other cylinder, a longitudinally disposed toothed rack fixed upon the exterior of each cylinder, and extending through the longitudinal slot of the forward section of the main tube to expose the rack teeth exteriorly of said forward section, means including rotatable pinions engaging the rack teeth, for shifting the interior cylinders and their respective lenses individually and relatively to one another axially of the main tube, and means joining one end of the forward section to the transparency holder in axial alignment with the rear section of the main tube.

3. An attachment for quickly converting to stereopticon usage, a motion picture projector characterized by an electric-arc light source and a tubular lens assembly housing, said attachment comprising a main tube in sections, one a longitudinally slotted forward section and the other a rear section, said rear section having one end dimensioned to interfit with the lens assembly housing so as to support the attachment in axial alignment therewith, a transparency holder on the opposite end of said rear section, said holder having a transverse passageway to receive a transparency to be light-projected, light condensing means within the rear section intermediate the ends thereof, a pair of longitudinally shiftable cylinders within the forward section of the main tube, an image size adjusting lens carried by one of said cylinders, a focusing lens carried by the other cylinder, a longitudinally disposed toothed rack fixed upon the exterior of each cylinder, and extending through the longitudinal slot of the forward section of the main tube to expose the rack teeth exteriorly of said forward section, means including rotatable pinions engaging the rack teeth, for shifting the interior cylinders and their respective lenses individually and relatively to one another axially of the main tube, and means joining one end of the forward section to the transparency holder in axial alignment with the rear section of the main tube.

4. An attachment for quickly converting to stereopticon usage, a motion picture projector characterized by an electric-arc light source and a tubular lens assembly housing, said attachment comprising a main tube in sections, one a forward section and the other a rear section, said rear section having one end dimensioned to frictionally engage the lens assembly housing so as to support the attachment in axial alignment therewith, a transparency holder on the opposite end of said rear section, said holder having a transverse passageway to receive a transparency to be light-projected, a longitudinally shiftable cylindrical member including a lens, disposed in the forward section of the main tube for adjusting the size of the image of a transparency placed in the holder and illuminated by the projector light source, a second longitudinally shiftable cylindrical member movable axially relative to the first-mentioned tube section and carried by the forward section of said main tube, including a lens for focusing said image, and means joining one end of the forward section to the transparency holder in axial alignment with the rear section of the main tube.

HENRY G. WEISS.

REFERENCES CITED

The following references are of record in the file of this patent:

UNITED STATES PATENTS

| Number | Name | Date |
| --- | --- | --- |
| 1,075,789 | Patton | Oct. 14, 1913 |
| 1,550,320 | Isbills | Aug. 18, 1925 |
| 1,636,647 | Patterson | July 19, 1927 |
| 1,738,942 | Brenkert et al. | Dec. 10, 1929 |
| 1,944,032 | Pointing et al. | Jan. 16, 1934 |
| 2,036,428 | Mihalyi | Apr. 7, 1936 |
| 2,057,153 | Lessler | Oct. 13, 1936 |
| 2,285,915 | Dutton | June 9, 1942 |
| 2,438,333 | Dickman | Mar. 23, 1948 |
| 2,452,745 | Getter | Nov. 2, 1948 |
| 2,477,896 | Pratt | Aug. 2, 1949 |

FOREIGN PATENTS

| Number | Country | Date |
| --- | --- | --- |
| 847,038 | France | June 19, 1939 |